(12) United States Patent
Lai

(10) Patent No.: US 6,760,083 B2
(45) Date of Patent: Jul. 6, 2004

(54) METAL BACKING PLATE STRUCTURE FOR A LIQUID CRYSTAL DISPLAY MODULE

(75) Inventor: Ching-Kun Lai, Chang Hua Hsien (TW)

(73) Assignee: HannStar Display Corp., Tao-Yuan Hsien (TW)

( * ) Notice: Subject to any disclaimer, the term of this patent is extended or adjusted under 35 U.S.C. 154(b) by 54 days.

(21) Appl. No.: 10/175,796

(22) Filed: Jun. 21, 2002

(65) Prior Publication Data

US 2003/0133056 A1 Jul. 17, 2003

(30) Foreign Application Priority Data

Jan. 11, 2002 (TW) .................................. 91200166 U

(51) Int. Cl.⁷ ............................................ G02F 1/1333
(52) U.S. Cl. ............................ 349/58; 349/59; 361/681
(58) Field of Search ................... 349/58, 59; 361/681

(56) References Cited

U.S. PATENT DOCUMENTS 6,330,148 B1 * 12/2001 Won et al. ................... 361/681
6,480,245 B1 * 11/2002 Sakamoto et al. ............ 349/59
6,593,979 B1 *  7/2003 Ha et al. ...................... 349/58

* cited by examiner

Primary Examiner—Huyen Ngo
(74) Attorney, Agent, or Firm—Troxell Law Office PLLC

(57) ABSTRACT

A metal backing plate structure for a liquid crystal display module is applied to a module type that has the backing plate mounted inner to a plastic frame thereof. The metal backing plate is pressed from a metal sheet and includes at least an improved side. The side is characterized by a ground protrusion with a predetermined length bent from the sheet. When the backing plate is assembled to the plastic frame, the ground protrusion penetrates through an aperture of the plastic frame for further contacting with a shield rim of a metal outer frame of the module. Thereby, an electrical connection between the outer frame and the metal backing plate can be directly established.

7 Claims, 6 Drawing Sheets

METAL BACKING PLATE STRUCTURE FOR A LIQUID CRYSTAL DISPLAY MODULE

FIELD OF THE PRESENT INVENTION

The present invention relates to a metal backing plate structure for a liquid crystal display module and more particularly to a metal backing plate structure that is integrally formed with a ground protrusion and an improved form to facilitate installation of the liquid crystal display module and to enhance the structural strength of the metal frame.

BACKGROUND OF THE PRESENT INVENTION

In the developments for computer applications, the main stream of display screens have gradually shifted from high-radiation and high-electric power consumption cathode ray tubes (CRTs) to low-radiation and lower-electric power consumption Thin-Film Transistor Liquid Crystal Display (TFT-LCD) panels. It is well known that the Conventional LCD panel is a non-illuminant device and must be coupled with a back light source to achieve the displaying effect. In the art, the back light performance of the LCD panel directly affects the display quality, and so it is easy to see that the back light element for dominating the back light performance is one of important components in the LCD module.

In general, a conventional LCD module mainly includes a plastic frame, a liquid crystal panel, a back light module (including a plurality of thin films, an acrylic light guiding plate, a light source, and a reflection sheet), and a metal backing plate. Overlapping of the plastic frame and metal backing plate can be grouped into two types. The first type has a plastic frame located over the inner side of a metal backing plat, while the second type has the plastic frame located outside the metal backing plate.

FIG. 1 illustrates a first-type LCD module that has a plastic frame 10 located over the inner side and a metal backing plate 11 located at the outer side. This type of module has the advantage of directly coupling the metal backing plate 11 to an outer frame (not shown in the drawing) that includes ground capability for achieving excellent ground effect. However, this type of LCD module has to deploy the plastic frame 10 in an inverse manner during assembly, and consecutively the liquid crystal panel, film layers (not shown in the drawing), light source (not shown in the drawing) and other elements are assembled in this inverse manner. Apparently, the assembly work of the first type is troublesome. Moreover, for the plastic frame 10 has a center opening to house the window, the film layers may drop accidentally due to negligence during assembly and thus it is quite possible that element damages may occur while assembling the first type of the LCD module.

FIG. 2 illustrates the second-type LCD module that has the plastic frame 10 located outside the metal backing plate 11 located on the inner side. This type of LCD module is assembled by consecutively stacking the reflection sheet 13, the light guiding plate (not shown in the drawing), the light source 16, the film layers (not shown in the drawing), the plastic frame 10, the liquid crystal panel 14 and the outer frame 15 over the metal backing plate 11. Hence, the film layers can be securely assembled without accidentally dropping. However, it is noted that, in this type of LCD module, the metal backing plate 11 is completely encased in the plastic frame 10 and thus cannot couple directly with the grounding outer frame 15. Therefore, a separate ground metal protrusion 12 must be provided to bridge the outer frame 15 and the metal backing plate 11 so as to achieve the required grounding effect.

Refer now to FIG. 3 for a perspective view of the metal backing plate 11 of FIG. 2 and also an enlarged view upon a corner of the metal backing plate 11 that presents the end of the metal backing plate 11 for grounding. As shown, the metal backing plate 11 has a jutting section 31 located at a jutting corner 111 (at a corner periphery 30) formed by shearing. In mechanics, it is obvious that such type of fabrication for forming the jutting section 31 cannot provide sufficient structural strength. While subjected to a bending in an up-and-down direction, the jutting section 31 may incur permanent deformation or even result in fracture at the sharp corner 310.

As previously discussed, conventional metal backing plates 11 have a lot of shortcomings in assembly and utilization. Therefore, a need to make an improved metal backing plate that can facilitate assembly work for LCD modules and also enhance structural strength as well as the grounding convenience is obvious.

SUMMARY OF THE PRESENT INVENTION

Accordingly, the primary object of the present invention is to provide a metal backing plate structure for a liquid crystal display (LCD) module that integrates a ground protrusion for directly coupling with a metal outer frame so as to simplify assembly work for the second-type of LCD module and to achieve better grounding effect.

Another object of the present invention is to provide a metal backing plate structure that presents a stronger strength by providing the metal backing plate with a smooth lateral side.

The metal backing plate structure of the present invention is adopted for the second type of LCD module that overlaps the plastic frame outside the metal backing plate. The metal backing plate with at least one lateral side is formed by pressing upon a flat metal sheet. The lateral side has at least one ground protrusion bent and extended by a predetermined length. While the metal backing plate is assembled with the plastic frame, the ground protrusion can penetrate through a corresponding aperture formed on the plastic frame. In a later assembling step, while an outer frame is assembled to an LCD module, the top end of the ground protrusion can directly contact with a shield rim of the outer frame so as to establish electrical connection between the outer frame and metal backing plate.

In order to prevent from serious stress concentration at a shearing point during pressing, the lateral side of the metal backing plate adjacent to the ground protrusion can adopt a smooth profile to improve the strength of the lateral side.

The metal backing plate of the present invention may be made of any conductive metal sheet, preferably an aluminum sheet.

The foregoing, as well as additional objects, features and advantages of the present invention will be more readily apparent from the following detailed description, which proceeds with reference to the accompanying drawings.

DESCRIPTION OF THE PREFERRED EMBODIMENT

Figure 1:
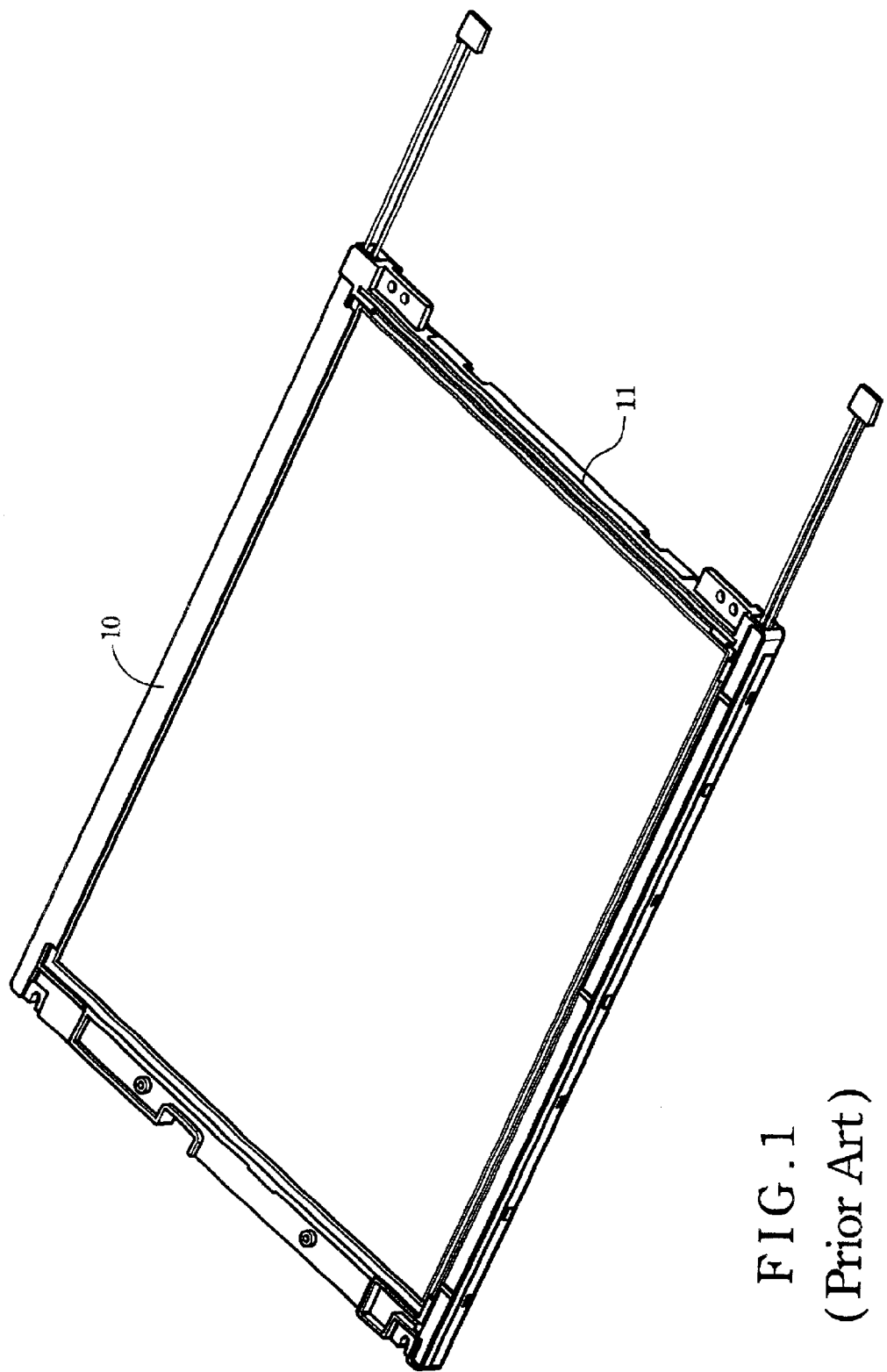
FIG. 1 is a perspective view of a conventional first-type LCD module with a plastic frame overlapped inside to a metal backing plate.
Figure 2:
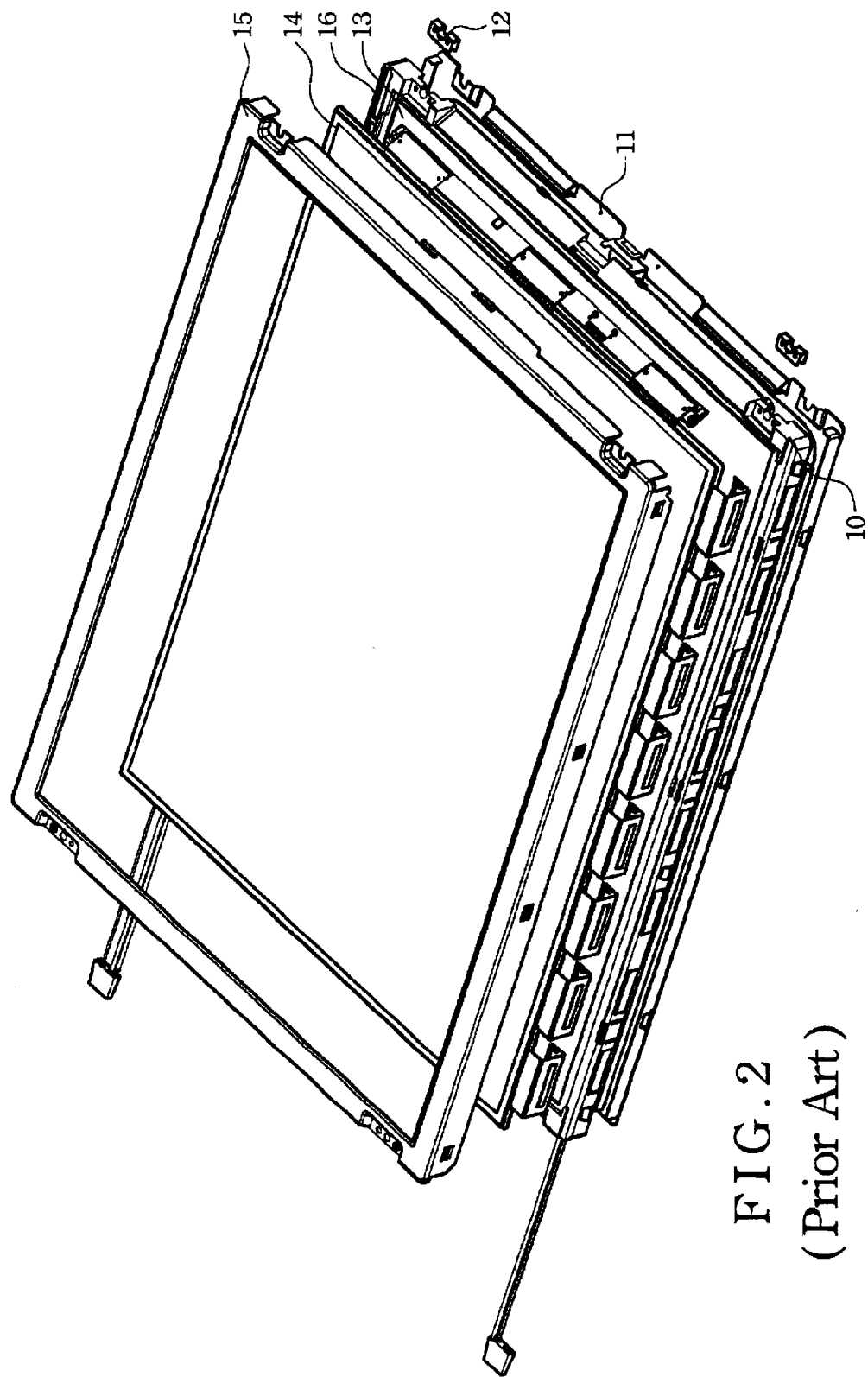
FIG. 2 is an exploded view of a conventional second-type LCD module with a plastic frame overlapped outside a metal backing plate.
Figure 3:
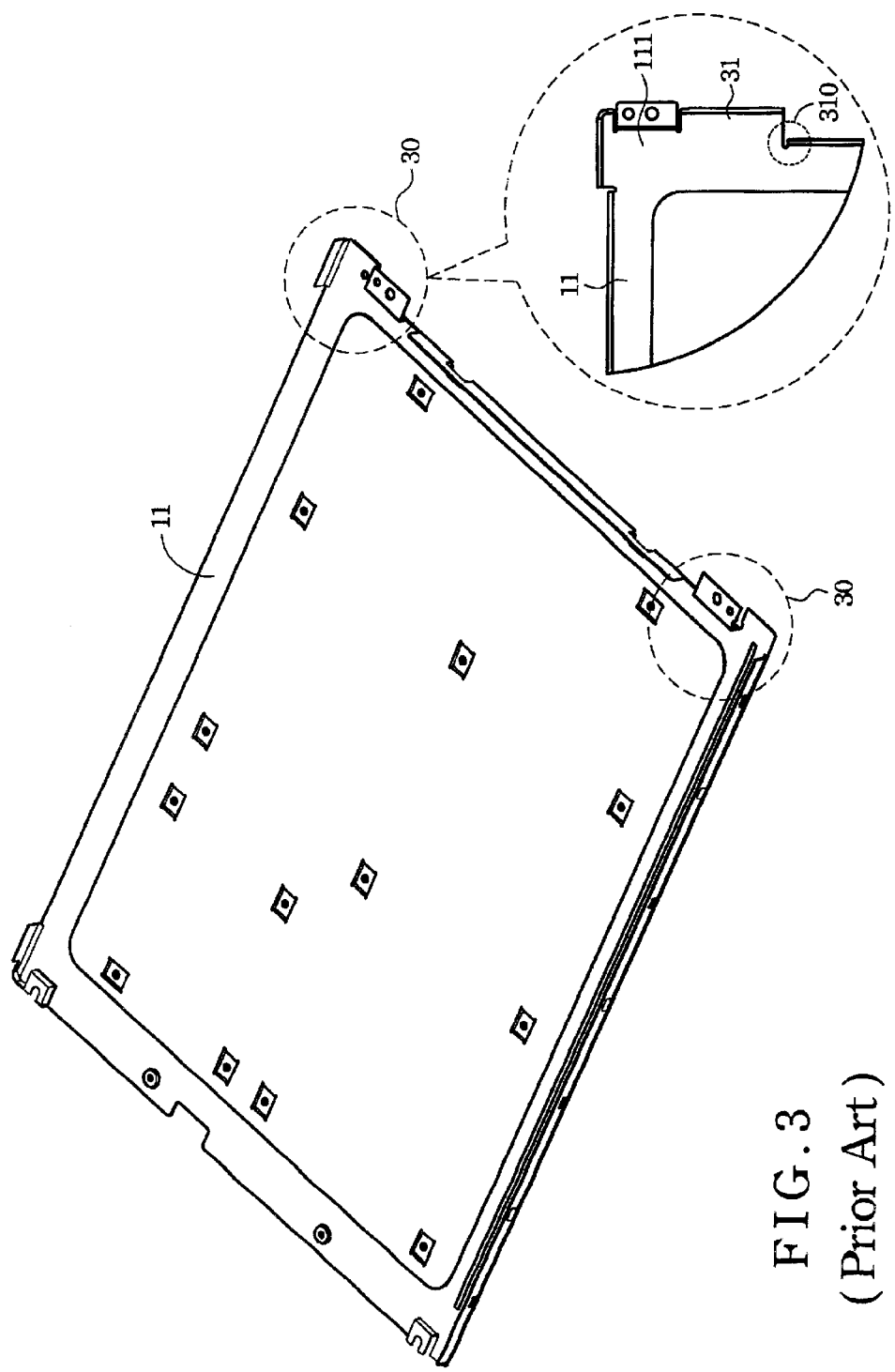
FIG. 3 is a perspective view of the metal backing plate of FIG. 2, also presenting an enlarged view upon a corner for grounding.

In order to maintain specification consistency, in the descriptions below, elements of same or similar function but with slightly different forms will be marked by same names and numerals in the drawings.

As previously discussed that the conventional metal backing plates have problems in assembling, grounding and strength, the present invention thus aims to provide an improved metal backing plate structure for a second-type LCD module to resolve aforesaid disadvantages.

Figure 4A:
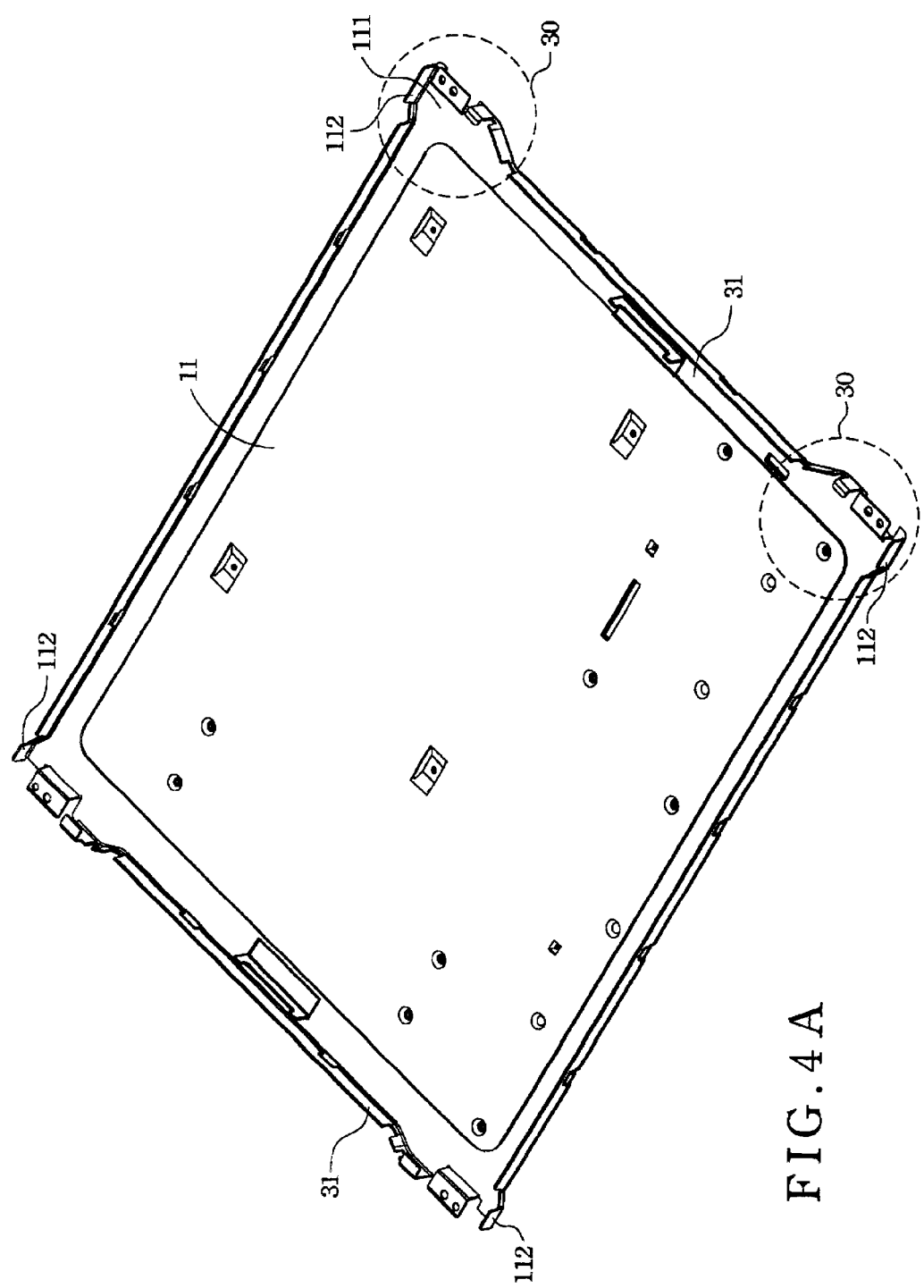
FIG. 4A is a perspective view of an embodiment of a metal backing plate structure of the present invention.
Figure 4B:
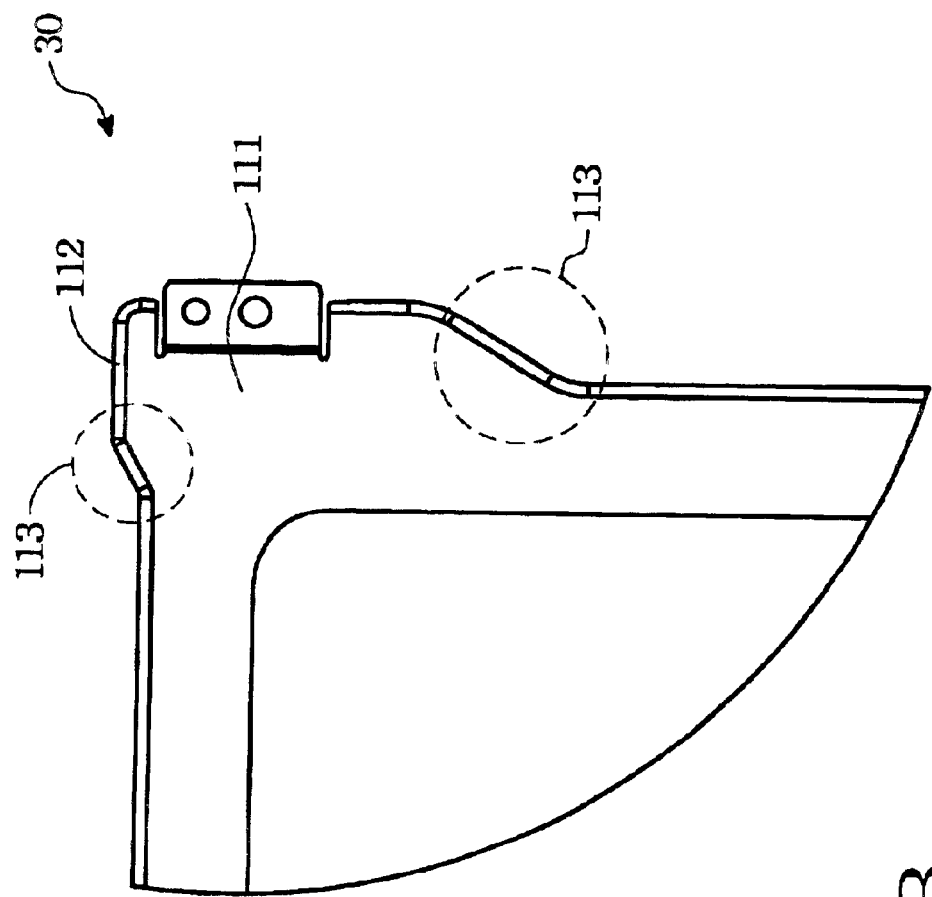
FIG. 4B is a schematic enlarged view of a jutting corner of FIG. 4A.

Referring now to FIGS. 4A and 4B for a metal backing plate 11 in accordance with the present invention and an enlarged fragmentary view upon a jutting corner periphery 30 of the plate 11, the metal backing plate 11 can be made of a flat metal sheet by pressing or any proper manufacturing method and include at least one lateral side 31 (two opposite lateral sides shown in the drawings). The lateral side 31 mainly has the following improvements:

1. An integrally formed ground protrusion 112 that is preferably located at a jutting corner 111 of the lateral side 31 (four jutting corners 111 shown in FIG. 4A). Each of the jutting corners 111 has at least one ground protrusion 112 (one ground protrusion 112 shown in the drawings). The ground protrusion 112 can be bent and extended for a predetermined length from the metal sheet to form a connection point of the metal backing plate 11 for further contacting with the metal outer frame.

2. The lateral side 31 of the metal backing plate 11 adjacent to the ground protrusion 112 is formed according to a smoother profile 113 (two smooth profiles 113 shown at each jutting corner 111). Such a design can prevent the shearing points during pressing from severe stress concentration. In elastic mechanics, the smooth profile 113 can contribute to the stress strength of the lateral side 31. In the present invention, the smooth profile 113 can be embodied as an arched angle, or any other streamline design.

In respond to the improvement of the metal backing plate 11, the LCD module elements also have to make some proper modifications. For instance, to match the design of the ground protrusion 112, a selected portion of the plastic frame has to be cut away to prevent interference during assembly. Also, to match the smooth profile 113 of the metal backing plate 11, the inner rim of the plastic frame has to be formed with the same configuration. However, such modifications are well known to the skilled in the art so that will be omitted herein.

Figure 5:
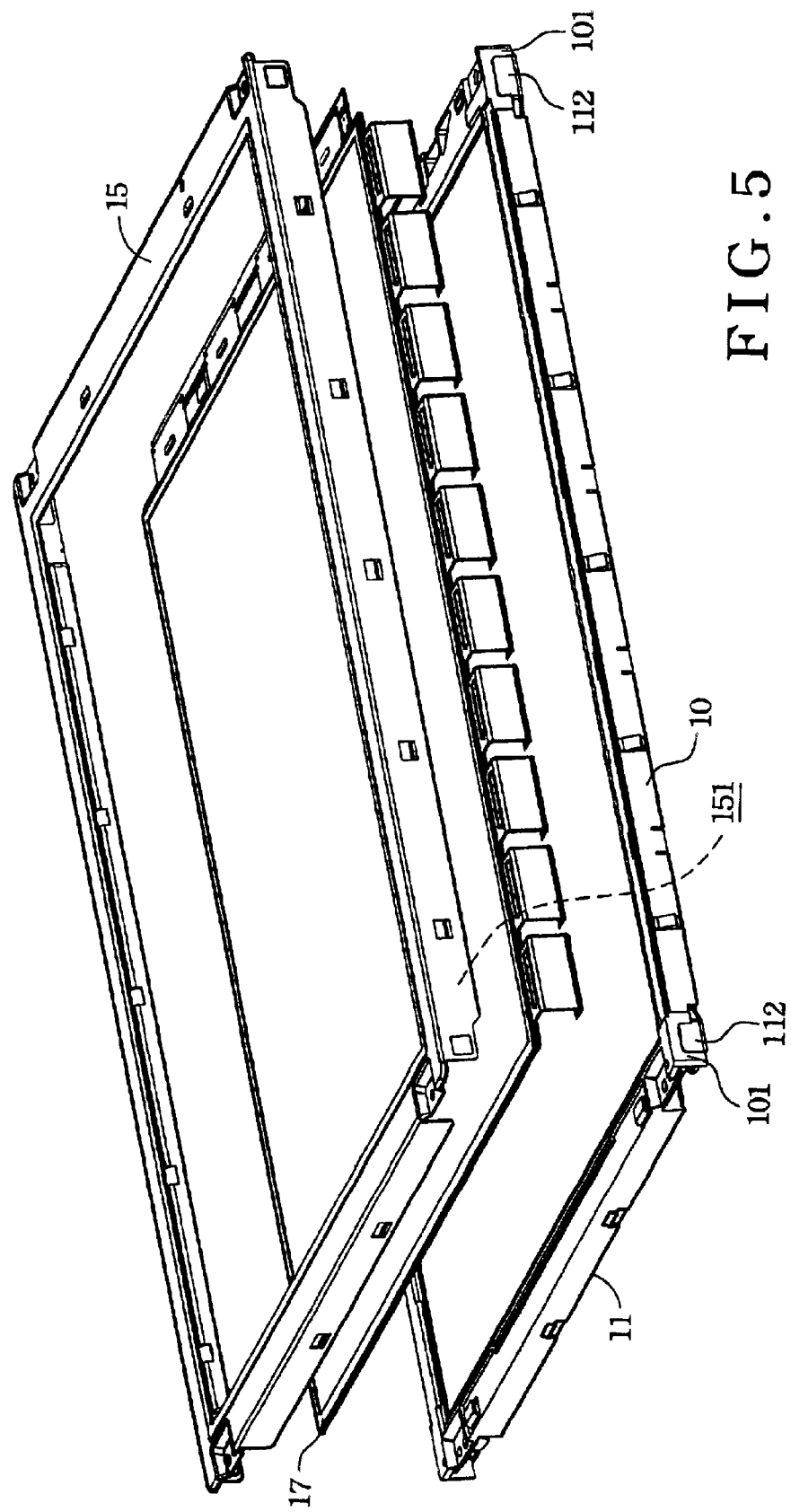
FIG. 5 is an exploded view of a second-type LCD module having the metal backing plate of FIG. 4A.

Referring now to FIG. 5 for a metal backing plate 11 of the present invention adopted to a second-type LCD module, the LCD module includes the metal backing plate 11 of the present invention, a plastic frame 10 (with the metal backing plate 11 housed therein), a back light module 17 and an outer frame 15.

As previously discussed, the plastic frame 10 has an aperture 101 for allowing the ground protrusion 112 of the metal backing plate 11 to extend therethrough to further contact with the outer frame 15. Also shown in the drawing, the back light module 17 is mounted to the metal backing plate 11, and the outer frame 15 having outer shield rims 151 is mounted on top to the back light module 17. The shield rim 151 can be used to couple with the plastic frame 10 for bonding the LCD module.

In the present invention, when the metal backing plate 11 is assembled on the plastic frame 10, the ground protrusion 112 can penetrate through the aperture 101 of the plastic frame 10 so that, after the outer frame 10 is assembled onto the LCD module, the top end of the ground protrusion 112 can directly contact with the shield rim 151 of the outer frame 15 so as to establish electrical connection between the outer frame 15 and the metal backing plate 11.

The metal backing plate 11 of the present invention may be made of any conductive metal sheet, preferably an aluminum sheet.

In the present invention, the ground protrusion 112 can directly contact the outer frame 15, thus assembly operations for the second type of the LCD module can be simplified. In addition, the smooth profile 113 of the lateral side 31 of the metal backing plate 11 can effectively improve locally the strength at the bending section of the lateral side 31.

Furthermore, the aperture 101 of the plastic frame 10 for accommodating the ground protrusion 112 of the metal backing plate 11 allows the plastic frame 10 and the metal backing plate 11 together to form a firm engagement so that secured positioning in between can be additionally achieved.

The improved metal backing plate 11 disclosed above integrates the advantages of conventional techniques existed in two types of LCD modules (i.e. aforesaid first type and second type as described in the background section). It is obvious that the present invention offers a novel structure with significant improvements over the conventional techniques.

While the preferred embodiment of the present inventions has been set forth for purpose of disclosure, modifications of the disclosed embodiment of the present invention as well as other embodiments thereof may occur to those skilled in the art. Accordingly, the appended claims are intended to cover all embodiments which do not depart from the spirit and scope of the present invention.

What is claimed is:

1. A metal backing plate structure for a liquid crystal display (LCD) module, in which the LCD module has a plastic frame located outside thereof, the metal backing plate structure comprising: a metal backing plate; having at least one lateral side, the at least one lateral side having at least one jutting ground protrusion integrally formed at a corner of the metal backing plate, and bent to extend a predetermined length, the metal backing plate is assembled to the plastic frame with the at least one jutting ground protrusion penetrating through an aperture formed on the plastic frame and corresponding to the ground protrusion, and the ground protrusion contacts a shield rim of an outer frame assembled on top of the plastic frame for establishing electrical connection between the metal backing plate and the outer frame.

2. The metal backing plate structure for a liquid crystal display (LCD) module of claim 1, wherein said at least one lateral side and said ground protrusion has a smooth profile in between.

3. The metal backing plate structure for a liquid crystal display (LCD) module of claim 1, wherein said metal backing plate is an aluminum plate.

4. A liquid crystal display module, comprising:
 a metal backing plate, made of a flat metal sheet and having at least one lateral side which has at least one ground protrusion integrally formed at a corner of the metal backing plate, and bent to extend a predetermined length;

a plastic frame located outside the metal backing plate and having an aperture corresponding to the ground protrusion;

a back light module mounted on the metal backing plate; and an outer frame made of metal, mounted on the back light module, and having a shield rim to couple with the plastic frame for housing the liquid crystal display module;

wherein the ground protrusion penetrates through the aperture of the plastic frame and contacts with the shield rim of the outer frame for establishing electrical connection between the outer frame and the metal backing plate.

5. The liquid crystal display module of claim 4, wherein said lateral side and said ground protrusion has a smooth profile in between to preventing stress concentration at said lateral side.

6. The liquid crystal display module of claim 4, wherein said metal backing plate is an aluminum plate.

7. The liquid crystal display module of claim 4, wherein said back light module further comprises:

a reflection plate;

a light source;

a light guiding plate;

a liquid crystal panel; and a plurality of thin films.

* * * * *